Oct. 1, 1957 — C. E. McCORMICK — 2,808,101
TRIM FASTENING MEANS FOR VEHICLE SEATS
Original Filed Dec. 20, 1948 — 3 Sheets-Sheet 2
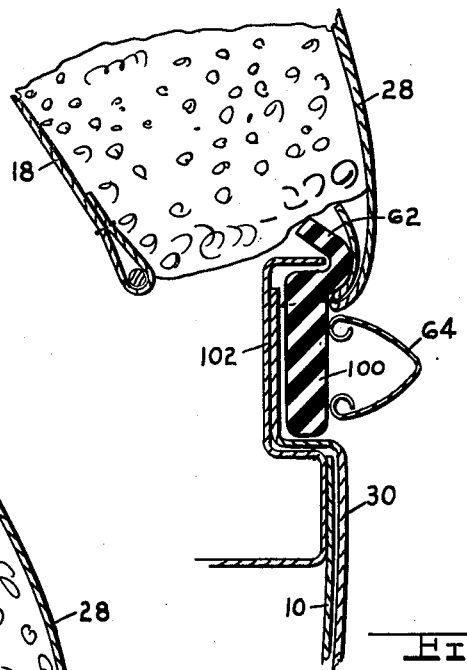
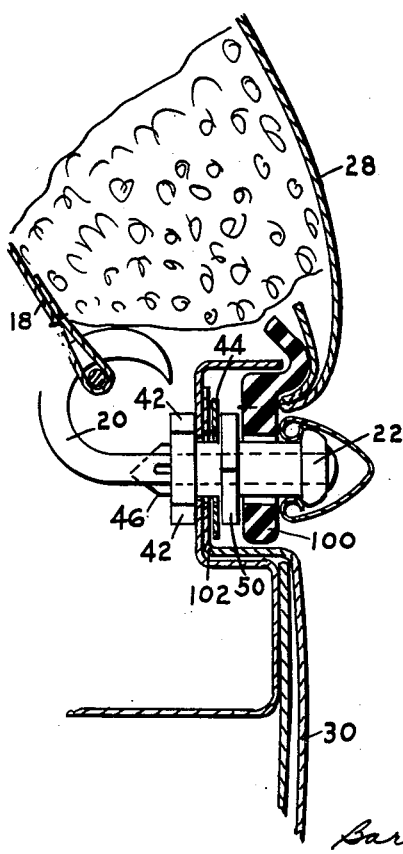
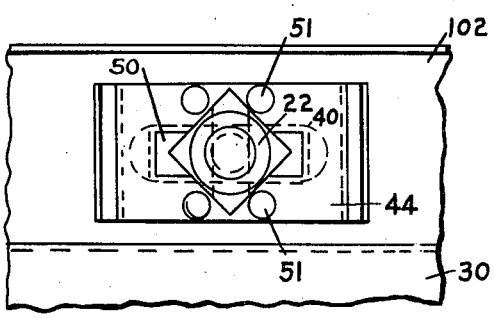
INVENTOR.
CHARLES E. McCORMICK
BY
Barnes, Kisselle, Laughlin & Raisch
ATTORNEYS

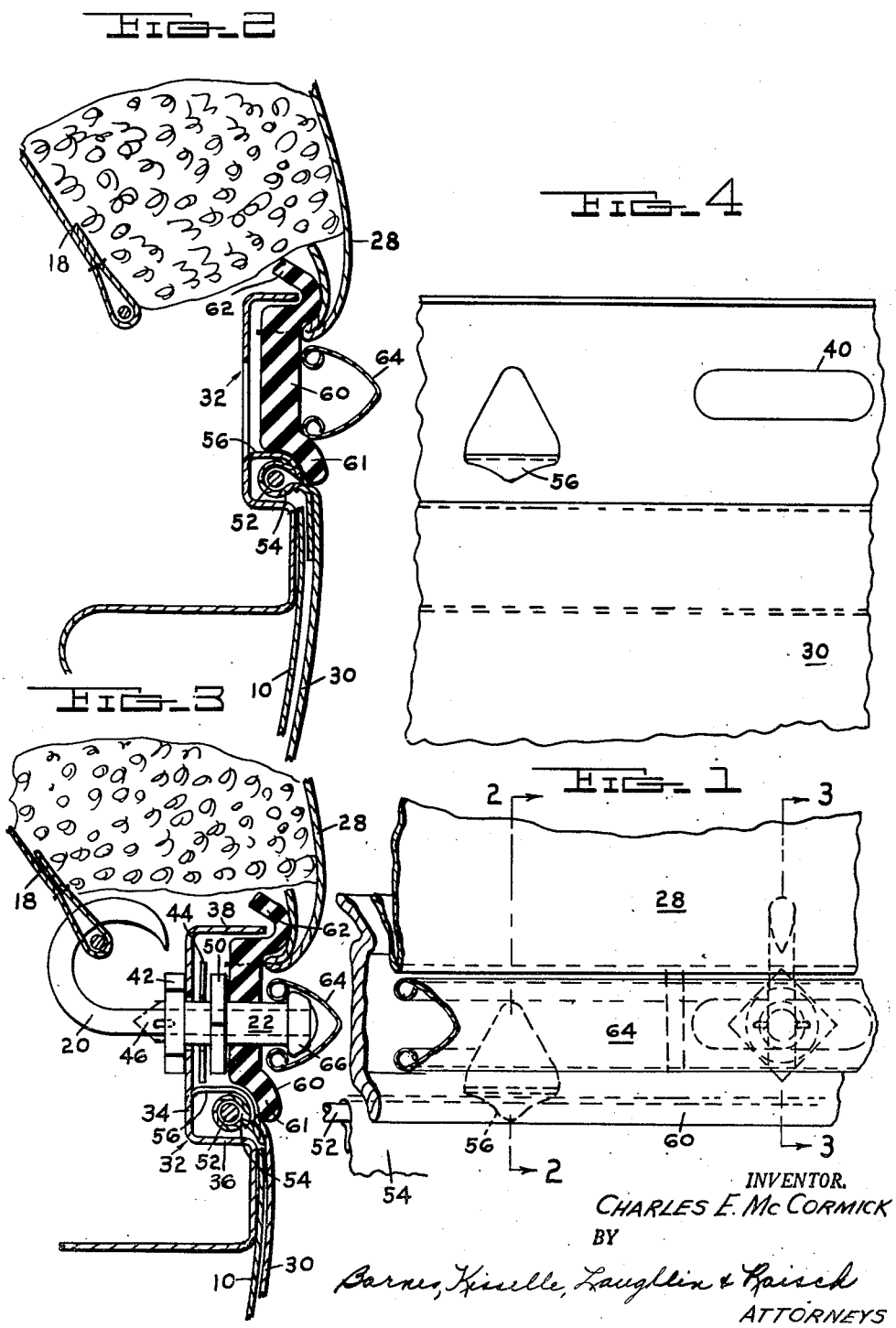

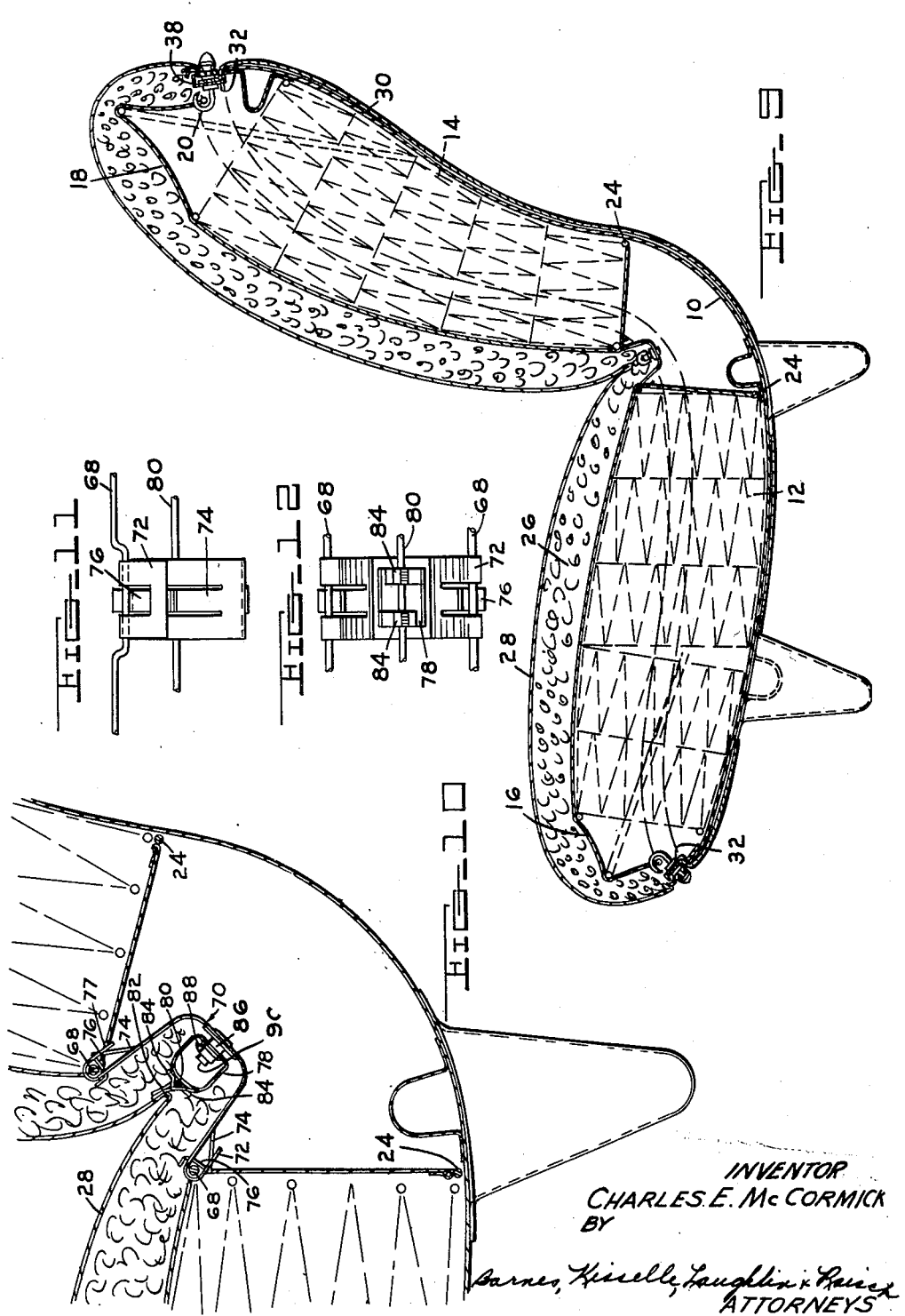

United States Patent Office 2,808,101
Patented Oct. 1, 1957

2,808,101

TRIM FASTENING MEANS FOR VEHICLE SEATS

Charles E. McCormick, Dearborn, Mich.

Original application December 20, 1948, Serial No. 66,178, now Patent No. 2,661,051, dated December 1, 1953. Divided and this application December 1, 1953, Serial No. 395,473

8 Claims. (Cl. 155—180)

This invention relates to trim fastening means for vehicle seats and more particularly to a one piece trim cover and the fastening means therefor.

In my application, Serial No. 705,390, filed October 24, 1946, now abandoned, there is disclosed a one piece trim cover and fastening means in the form of a rubber molding sewn around the edge of the cover, the molding being reinforced with a wire inserted therein and being perforated at spaced points for engagement with correspondingly spaced studs secured around the edge of the seat pan. The molding is held in place on the studs and is concealed by a finish channel-shaped molding which snaps over the enlarged heads of the studs. Although that construction has proven generally successful, its attractiveness depends upon the stiffness of the wire insert to hold the peripheral edge of the cover in a smooth line without a scalloping effect between the studs. Another objectionable feature is that insertion of the wire in the rubber molding when assembling and removal of the wire therefrom for cleaning the cover have proved to be both bothersome and expensive.

It is an object of this invention to provide a fastening means for the cushion trim cover of a vehicle seat which includes an edge molding sewn around the edge of the trim cover but which is shaped to engage with a flange on the seat pan such that the tension of the fabric is resisted by the flange uniformly along the molding instead of at localized points along the molding. I have found that with my improved construction there is no need for the provision of a rigid reinforcing wire within the edge molding and that the seat can be produced more economically.

Another object of the invention is to provide a trim fastening construction which enables the removal and replacement of an outer trim cover on the outer back and side surfaces of the seat pan, that is, a trim cover which extends around the back, sides, and a portion of the bottom of the seat.

A further object of the invention resides in the provision of an improved fastening device for anchoring the trim cover for the seat cushion supporting surfaces along the mid-line between the horizontal and vertical supporting surfaces.

In the drawings:

Figure 1 is a fragmentary view of the seat constructed in accordance with this invention showing a portion of the seat along the upper rear edge of the seat pan.

Figure 2 is a sectional view taken along lines 2—2 in Figure 1.

Figure 3 is a sectional view taken along lines 3—3 in Figure 1.

Figure 4 is a fragmentary view of an edge portion of the seat pan taken at a point corresponding to Figure 1 before the trim cover and trim fastening means are secured thereto.

Figure 5 is a fragmentary view of an edge portion of the seat pan before the trim cover for the seat is applied and showing an alternate method of attaching the outer trim cover to the seat pan.

Figure 6 is a fragmentary cross section of the modified form of construction shown in Figure 5 taken through a point corresponding to the position of one of the stud members.

Figure 7 is a sectional view similar to Figure 6 but taken at a point spaced from the stud members.

Figure 8 is a side view of the spring washer utilized for securing the studs in place along the edge of the seat pan.

Figure 9 is a cross section of the completely assembled seat of this invention.

Figure 10 is a sectional view on an enlarged scale showing a portion of the structure in Figure 9 in greater detail.

Figure 11 is a side view of the spring fastener utilized for anchoring the trim cover along the mid-line between the back and bottom spring units.

Figure 12 is a top view of the fastener assembly shown in Figure 11.

Referring to the drawings and particularly to Figure 9 there is shown a seat which comprises a sheet metal seat frame in the form of a pan 10 having the general contour illustrated and in which are positioned a horizontal spring unit 12 and a vertical spring unit 14. The spring units may be mounted in the seat pan by any suitable means which support the springs in their desired relative position. Each of the spring units is provided with a spring cover. Spring cover 16 extends over spring unit 12 and cover 18 extends over spring unit 14. Covers 16 and 18 are secured around their outer edges to the edges of the seat pan by engagement with the hook portions 20 of studs 22 which are secured around the edge of the seat pan. Along the adjacent inner edges of the spring units covers 16 and 18 extend downwardly over the upper wire rims 68 of the spring units and are secured to the bottom rims of the spring units as shown at 24. A pad 26 overlies both the spring covers. Pad 26 is composed of the usual cotton padding covered with cheese cloth or the like.

The seat is finished on its outer surface with two trim covers 28 and 30. Trim cover 28 overlies pad 26 and trim cover 30 extends over the outer surface of the seat pan, that is, around the back, bottom and sides of the pan. These trim covers are secured to the seat pan by the novel means which will now be described. Around the peripheral edge of seat pan 10 there is welded or otherwise secured a flanged or channel member 32 which is preferably shaped and positioned so that the base portion 34 thereof is offset inwardly of the edge of the seat pan. Channel member 32 is formed with a flange 36 along its inner edge by which the channel is anchored to the seat pan and a flange 38 along the free edge of the channel. The base portion 34 of channel 32 is provided with a plurality of uniformly spaced elongated apertures 40 through which the hook portions 20 of studs 22 are adapted to be inserted. Stud 22 is provided with an elongated lug or shoulder portion 42 on its shank which is adapted to be inserted through slot 40 and engaged with the back surface of the base portion 34 when the stud is turned 90° so that the lug 42 is disposed crosswise to slot 40. The stud is held in the position shown by means of a spring washer 44 having spaced fingers 46 extending through and engaged by slots 40 and upturned spring portions 48 at each end thereof which seat against the base portion 34 of channel 32 when the clip is arranged in the channel with fingers 46 projecting through slots 40. When the stud 22 is inserted through spring clip 44 and slots 40, hook portion 20 foremost, and turned 90° so that the plane of the hook portion 20 extends transversely of the axis of channel 32, spring clip 44 is flexed at its central portion by a flange portion 50 on stud 22 so that the elongated lug 42 is pulled up tight against the back face of channel 32. Lug 42 and flange 50 are spaced apart on the shank of stud 20 so that the spring clip 44 is flexed about the upturned ends 48 when the stud is turned to the operative position. The stud 22 is thereby retained in place under a spring tension, and by the detents 51 formed on the outer face of clip 44, which detents are spaced to engage the edges of the square shaped flange 50 as is shown in Fig. 5.

In the form of invention shown in Figures 1 through 4 the back trim cover 30 which extends around the back and bottom of the seat pan is reinforced around its peripheral edge with a wire 52. The wire is retained within a hemmed portion 54 around the edge of cover 30. Cover 30 is secured on the seat pan 10 by means of metal tabs 56 which are struck out from the base portion 34 of channel 32 and turned over the wire 52 so as to firmly retain the hemmed portion 54 within the channel 32. Whenever it is desired to remove or replace trim cover 30 the metal tabs 56 are simply straightened out so as to permit withdrawal of the hemmed portion 54 from within the channel 32. The front trim cover 28 which extends over the supporting surface of the seat has sewn around its peripheral edge a flexible molding 60 which is preferably made of rubber or plastic. Molding 60 is perforated for engagement with studs 22 and is dimensioned so as to fit within channel 32. Along one edge molding 60 is fashioned to provide a flange 61 which conceals tabs 56 and the wired edge of cover 30. Along its other edge the molding is provided with a flange portion 62 of angular cross section which fits over flange 38 of channel 32. Flange 38 forms a shoulder against which molding 60 abuts when trim cover 28 is arranged on the seat. Edge molding 60 is held in place one studs 22 by means of a channel shaped finish molding 64 which snaps over the enlarged heads 66 at the outer ends of studs 22 and bears against the outer face of the molding 60. The hook portions 20 of studs 22 serve as a means for anchoring the outer edges of spring covers 16 and 18.

The upper wire rims 68 of spring units 12 and 14 are secured together along their adjacent sides by a plurality of straps formed as U-shaped spring fasteners 70. The upper end of each leg of fastener 70 is provided with a return bend portion 72. The central portion of each leg of clip 70 is bent outwardly as at 74 and then transversely inwardly and upwardly as at 76 so as to provide laterally offset fingers which cooperate with the return bend portion 72 to engage the upper rims 68 of spring units 12 and 14. The fastener 70 is adapted to be engaged with the rims 68 by merely positioning the fastener so that the rims 68 are arranged at each side of the fastener between the legs of the fastener and the lower ends of the return bend portions 72. The fastener is then depressed so that the spring fingers 74 are flexed inwardly by the rims until the rims reach the upper end of the return bend portions 72 at which point the fingers 74 snap outwardly and hold the fastener on the rims. When it is desired to disengage fasteners 70 from the spring units the spring fingers 74 are flexed inwardly so as to clear the rims 68, thereby permitting the fastener to be withdrawn. The fabric trim cover 28 is anchored to fastener 70 by means of clip members 78. These clips are secured to the trim cover 28 by means of a wire 80 inserted within a hemmed portion 82 sewn on the inner face of the cover. Clip 78 is fashioned at its upper end with a pair of spring fingers 84 which are spaced apart and have their free ends extending in opposite directions. To engage the clip with wire 80 the clip is positioned against bared portions of the wire with fingers 84 straddling the wire and the clip is then twisted 90° so as to engage the wire under each of the fingers. At its lower end clip 78 is arranged to be inserted over an upwardly projecting stud 86 secured to the base of fastener 70 and having a spring catch 88 thereon which engages with clip 78 so as to prevent the clip from being withdrawn from the stud. Spring catch 88 is arranged to be retracted to permit the removal of the clip 78 from stud 86 by means of a push button 90 on the upper end of stud 86.

In the modified form of invention shown in Figures 5 through 8 the front trim cover 28 is secured on the seat in a manner similar to that previously described by means of an edge molding 100 but the fabric cover 30 is attached to the seat pan by cementing its edge within the channel member 102. Channel 102 is accordingly narrower than channel 32 described with reference to the previous embodiment of the invention and the edge molding 100 is shaped to fit nicely within channel 102. This latter method of attaching the fabric trim cover 30 is preferably utilized when it is desired to attach the outer trim cover on the back and sides of the seat pan in a permanent manner.

It will thus be seen that I have provided trim fastening means for a vehicle seat which enable the trim covers to be quickly removed or replaced on the seat at will. The use of the edge molding around the edge of the cushion trim cover and the provision of a flange around the edge of the seat pan against which the edge moulding is shouldered distributes the tension of the fabric uniformly and holds the edge of the cushion trim cover in a smooth line. This arrangement also eliminates the necessity for the provision of a reinforcing wire within the molding. This application is a division of my copending application, Serial No. 66,178, filed December 20, 1948, now United States Patent No. 2,661,051.

What I claim is:

1. In a vehicle seat of the type having a trim cover extending over the seat supporting surface and attached along the edge thereof to a seat supporting frame, means for detachably securing said trim cover to said frame comprising a flexible molding fixedly secured to said trim cover substantially continuously along the edge thereof, said molding being attached to said trim cover so that the outer longitudinal edge of said molding extends outwardly beyond the line of connection between said molding and said trim cover, said supporting frame having a flanger member extending around the edge thereof against which said molding is adapted to be positioned and secured when the trim cover is arranged over the cushion supporting surfaces of the seat, spaced fastening means on said flanged member arranged to detachably engage with said molding along longitudinally spaced points, and a shoulder along said flanged member against which the inner edge of said molding abuts when the molding is positioned on said flanged member, said shoulder lying in a plane generally transversely of the line of pull of said trim cover on said molding.

2. The combination as set forth in claim 1 wherein said molding is attached to said trim cover so that the inner longitudinal edge of said molding underlies and is concealed by the edge portion of said trim cover, the inner longitudinal edge of said molding having a flange portion thereon adapted to extend over the shoulder on the flanged member so that when said molding is positioned on said flanged member the flange portion of said molding is interposed between said shoulder and said trim cover so as to prevent cutting and wearing of the trim cover by contact with the edge of said shoulder.

3. In a vehicle seat of the type having a trim cover extending over the seat cushion supporting surface and attached along the edge thereof to a seat supporting frame, means for detachably securing said trim cover to said frame comprising a flexible molding secured along the edge of said trim cover and having a plurality of longitudinally spaced apertures thereon, said seat frame having around its peripheral edge a flanged member on which said molding is adapted to be positioned when the trim cover is arranged over the cushion supporting surface of said seat, a plurality of studs projecting from said flange and spaced to correspond with the apertures in said molding so that the molding can be removably positioned on said flanged member over said studs with the studs projecting through the apertures in said molding, said flanged member having a longitudinal shoulder thereon spaced from said studs and positioned to positively engage said molding, said shoulder lying in a plane generally transversely of the line of pull of said trim cover on said molding.

4. The combination as set forth in claim 3 including a resilient finish molding of channel shaped section, and means spaced from the outer face of said molding and at the outer ends of said studs adapted to be releasably engaged by said resilient finish molding, said last mentioned means being spaced outwardly from said flanged member such that when said finish moling is engaged therewith, the longitudinal edges of said finish molding bear against the outer face of said flexible molding whereby said flexible molding is held flatly against said flanged member by said finish molding and is prevented from shifting transversely of the flanged member by said shoulder.

5. In a vehicle seat of the type having a base and a pair of spring units supported on the inner face of said base, the combination of a trim cover extending over the supporting surfaces of said spring units, a second trim cover extending over the outer surface of said base, said second trim cover having relatively rigid means extending continuously along and reinforcing the edge portions thereof, a member of channel section secured to and around the edge of said base, distortable means in said channel member detachably engaging said reinforcing means and clinching said reinforcing means against one of the longitudinal side walls of said channel member, said first mentioned trim cover having a flexible molding secured substantially continuously around the peripheral edge thereof, said molding being removably secured in said channel member and having a flange portion overlying and concealing said clinching means and the reinforced edge of said second trim cover, said channel member having a shoulder thereon against which a longitudinally continuous portion of said molding abuts, said shoulder lying in a plane generally transversely of the line of pull of said first trim cover.

6. In a vehicle seat of the type having a trim cover extending over the seat cushion supporting surface and attached along the edge thereof to a seat supporting frame, means for detachably securing said trim cover to said frame comprising a flexible molding fixedly secured substantially continuously along the edge of said trim cover, said seat frame having around its peripheral edge a channel on which said molding is adapted to be positioned when the trim cover is pulled taut over the cushion supporting surface of said seat, said channel having a longitudinal shoulder thereon against which said molding abuts, said shoulder cooperating with said molding to maintain said trim cover in taut condition overlying said cushion supporting surface, means engaged with said channel and releasably with said molding for releasably holding said molding in position on said channel against said shoulder and a trim molding releasably engaged with said holding means.

7. In a vehicle seat of the type having a trim cover extending over the seat cushion supporting surface and attached along the edge thereof to a seat supporting frame, means for detachably securing said trim cover to said frame comprising a flexible molding secured along the edge of said trim cover, said seat frame having around its peripheral edge a flange on which said molding is adapted to be positioned when the trim cover is arranged over the cushion supporting surface of said seat, said flange having a longitudinal shoulder thereon against which said molding is positioned, means engaged with said flange and said molding for holding said molding in position on said flange and a trim molding engaged with said holding means, said holding means comprising studs extending through said flange and said molding, said studs having hook members at one end and having enlargements at the opposite end with which said trim molding is engaged.

8. In a vehicle seat of the type having a trim cover extending over the seat cushion supporting surface and attached along the edge thereof to a seat supporting frame, means for detachably securing said trim cover to said frame comprising a flexible molding secured along the edge of said trim cover, said seat frame having around its peripheral edge a channel shaped flange member in which said molding is adapted to be positioned when the trim cover is arranged over the cushion supporting surface of said seat and studs extending through said molding and said channel shaped flange between the side walls of said channel shaped flange, said studs being provided with an enlarged head at one end being fashioned as hook members at the opposite ends and including a trim molding engaged with said enlarged head of said studs and urging said molding into said channel shaped flange.

References Cited in the file of this patent

UNITED STATES PATENTS

| 941,875 | Henry | Nov. 30, 1909 |
| 1,209,533 | Abbott | Dec. 19, 1916 |
| 1,369,940 | Silvester | Mar. 1, 1921 |
| 1,447,191 | Vetter | Mar. 6, 1923 |
| 1,869,081 | Schemmel | July 26, 1932 |
| 2,333,311 | Greitzer | Nov. 2, 1943 |

FOREIGN PATENTS

| 106,651 | Australia | Mar. 2, 1939 |
| 407,518 | Great Britain | Mar. 22, 1934 |